(12) United States Patent
Sumi et al.

(10) Patent No.: US 7,428,034 B2
(45) Date of Patent: Sep. 23, 2008

(54) LIQUID CRYSTAL DISPLAY DEVICE

(75) Inventors: Akinori Sumi, Nishigoshi-machi (JP);
Yasuhiro Morii, Nishigoshi-machi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/015,267

(22) Filed: Jan. 16, 2008

(65) Prior Publication Data

US 2008/0117370 A1 May 22, 2008

Related U.S. Application Data

(62) Division of application No. 10/438,971, filed on May 16, 2003, now Pat. No. 7,345,731.

(30) Foreign Application Priority Data

May 17, 2002 (JP) .............................. 2002-142940

(51) Int. Cl.
*G02F 1/1339* (2006.01)
(52) U.S. Cl. ........................ 349/155; 349/156
(58) Field of Classification Search .......... 349/155–156
See application file for complete search history.

(56) References Cited

U.S. PATENT DOCUMENTS

| 6,097,467 | A | 8/2000 | Fujimaki et al. |
| 6,356,330 | B1 | 3/2002 | Ando et al. |
| 6,414,739 | B2 | 7/2002 | Suzuki |
| 6,433,852 | B1 | 8/2002 | Sonoda et al. |
| 6,459,465 | B1 | 10/2002 | Lee |
| 6,509,948 | B2 | 1/2003 | Suzuki |
| 6,864,946 | B2 | 3/2005 | Kim |
| 6,903,792 | B2 | 6/2005 | Hiroshi |
| 2002/0113935 | A1 | 8/2002 | Yanagawa et al. |

FOREIGN PATENT DOCUMENTS

| JP | 10-48636 | 2/1998 |
| JP | 11-038420 | 2/1999 |
| JP | 11-142863 | 5/1999 |
| JP | 11-002718 | 6/1999 |
| JP | 11-212075 | 6/1999 |
| JP | 2000/137229 | 5/2000 |
| JP | 2000-199904 | 7/2000 |
| JP | 2000-227598 | 8/2000 |

(Continued)

*Primary Examiner*—David C. Nelms
*Assistant Examiner*—Phu Vu
(74) *Attorney, Agent, or Firm*—Oblon, Spivak, McClelland Maier & Neustadt, P.C.

(57) ABSTRACT

A liquid crystal display device has the first substrate and the second substrate. The first substrate includes a gate line, a source line crossing the gate line, a switching element connected to the source line, a liquid crystal drive electrode connected to the switching element and having a plurality of electrodes substantially parallel to each other, and a common electrode consisting of a plurality of comb-shaped electrodes arranged substantially parallel to and alternately with the liquid crystal drive electrode. The second substrate includes color filters arranged in an array arrangement and a black matrix provided between the color filters. A spacer between the substrates contacts the first substrate in the area where the gate line, the liquid crystal drive electrode, and the common electrode are arranged in the vicinity of each other.

2 Claims, 10 Drawing Sheets

FOREIGN PATENT DOCUMENTS

| | | |
|---|---|---|
| JP | 2000-292802 | 10/2000 |
| JP | 2000-298281 | 10/2000 |
| JP | 2001-005007 | 1/2001 |
| JP | 2001-305554 | 10/2001 |
| JP | 2001/318369 | 11/2001 |
| JP | 2002-023171 | 1/2002 |
| JP | 2002-082337 | 3/2002 |

LIQUID CRYSTAL DISPLAY DEVICE

CROSS-REFERENCE TO RELATED APPLICATIONS

This application is a divisional of Application U.S. Ser. No. 10/438,971 which was filed May 16, 2003 and claims priority to Japanese Application No. 2002-142940 which was filed May 17, 2002, the entire contents of which are incorporated herein by reference.

BACKGROUND OF THE INVENTION

1. Field of the Invention

The present invention relates to a liquid crystal display device and more specifically to a liquid crystal display device with a high aperture ratio for achieving higher brightness, lower power consumption, and lower costs.

2. Related Background Art

A liquid crystal display device has a pair of transparent substrates placed opposite to each other. One is a thin film transistor array substrate which will be hereinafter referred to as a TFT substrate, and the other is a color filter substrate as a CF substrate. The substrates are provided with electrodes to drive a liquid crystal layer. On the TFT substrate, a switching element and a liquid crystal drive electrode and the like connected to the switching element are formed in an array arrangement. On the CF substrate, a black matrix (hereinafter referred to as a BM) arranged between color filters comprising of red, green, and blue films are formed corresponding to each switching element. Liquid crystal material is filled between the two substrates to display images by its polarization mechanism. A twisted nematic mode has been generally applied for driving liquid crystal, in which an electric field perpendicular to substrates is applied to liquid crystal to change the alignment direction of liquid crystal molecules from horizontal to vertical.

The twisted nematic mode, however, has the problem of a narrow viewing angle since the liquid crystal molecules aligned vertically by the electric field make a certain angle with the substrates to vary brightness depending on the direction As a solution to the above problem, a liquid crystal display device of an In-Plane Switching mode (which will be hereinafter referred to as an IPS mode") has come into use, in which an electric field substantially parallel to substrates is applied to liquid crystal to cause liquid crystal molecules to rotate in the horizontal direction.

In the IPS mode liquid crystal display device, liquid crystal molecules are always parallel to substrates, and therefore a viewing angle is significantly wider than the twisted nematic liquid crystal display device. The IPS liquid crystal display device has come to the front for use as a monitor.

In a liquid crystal panel, an adhesive agent called sealing material is applied to the periphery of the CF substrate being adhered to the TFT substrate. There is a gap between the two substrates, in which liquid crystal material is filled. It is difficult to have the uniformity of the gap over an entire substrate, and therefore the gap varies between places, causing brightness and color to change to produce uneven picture. Since the change in brightness and color according to the gap is generally greater in the IPS mode than in the twisted nematic mode, the IPS mode especially requires the uniformity of the gap over the entire substrate.

Figure 9:
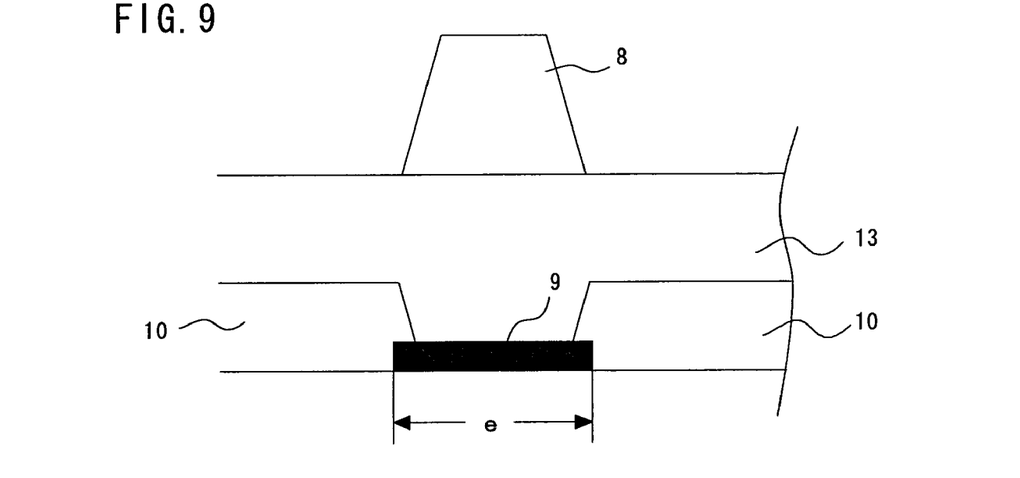
FIG. 9 is a block diagram of the CF substrate.

In order to ensure the uniformity of the gap width, a number of spacers are generally provided over the plane between the substrates. The spacers are generally formed on the CF substrate in the configuration shown in FIG. 9. The reference numeral 8 designates the spacer, 9 a BM as a light-shielding layer, 10 a color filter as an RGB pixel, and 13 an overcoat layer to planarize the surface of the CF substrate.

Figure 10:
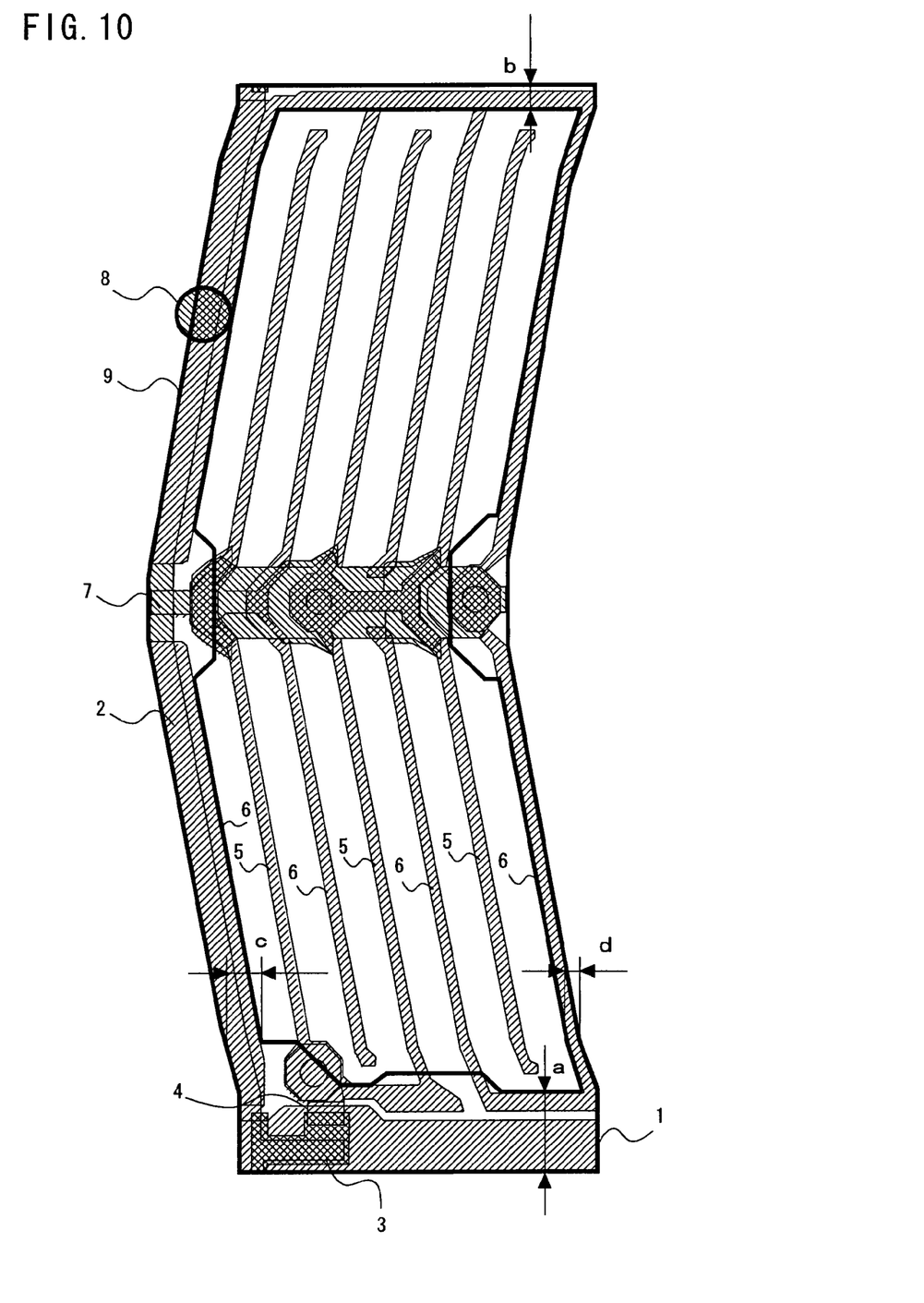
FIG. 10 is a block diagram of a pixel area of a conventional liquid crystal display device.
Figure 11:
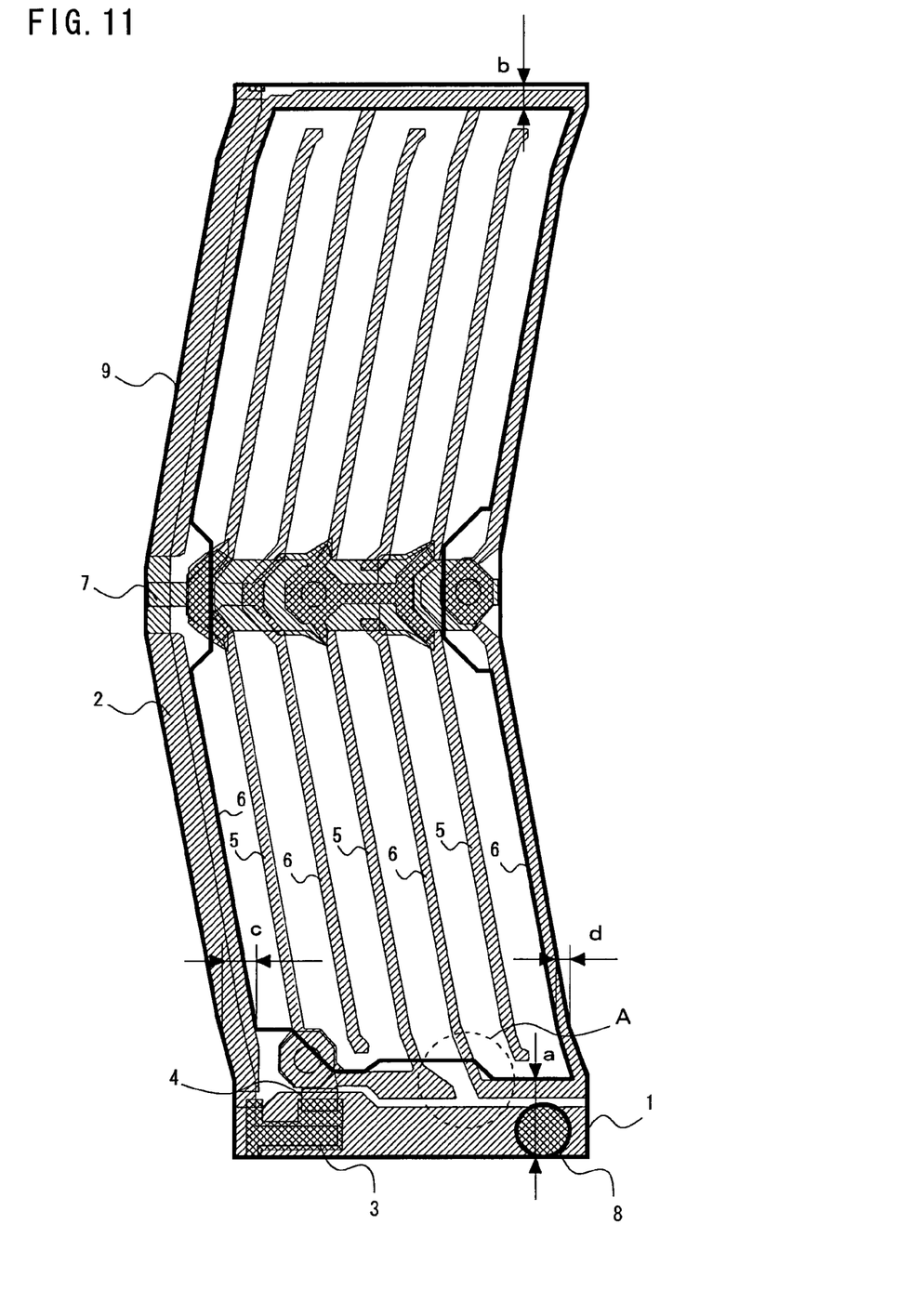
FIG. 11 is a block diagram of a pixel area of a conventional liquid crystal display device.

Conventionally, when the CF substrate and the TFT substrate are overlapped, the spacer 8 is located in the position shown in FIGS. 10 and 11 on the TFT substrate. The reference numeral 1 designates a gate line, 2 a source line, 3 a source electrode, and 4 a drain electrode, which constitute a switching element of a TFT. The reference numeral 5 designates a liquid crystal drive electrode connected to the drain electrode 4, 6 a common electrode placed opposite to the liquid crystal drive electrode 5, and 7 a common capacitor line connected to the common electrode 6. An electric field between the liquid crystal drive electrode 5 and the common electrode 6 causes liquid crystal material to align. In the IPS mode, the liquid crystal drive electrode 5 and the common electrode 6 are comb-shaped to apply a charge horizontally. The BM 9 are placed in the position shown by a heavy line in FIGS. 10 and 11 (the position corresponding to the gate line 1 and the source line 2) on the CF substrate in order to block light between pixels. FIGS. 10 and 11 are enlarged views of one pixel, and the pixels are arranged in an array arrangement.

In the arrangement shown in FIG. 10, the spacer 8 contacts the TFT substrate on the source line 3. The normal diameter of the spacer 8 is approximately 10 to 20 μm. Since the pixels are arranged in an array arrangement, the line width e of the BM 9 is the sum of c plus d in FIG. 10 which is approximately 15 μm being substantially equal to the spacer 8.

The height of the spacer 8 should be equal in order to have the uniform width of a cell gap (the gap between the two substrates). Therefore, when the substrates are arranged facing each other, the spacer 8 should not overlap with the color filters 10 nor stick out the BM 9. Also, the BM 9 and the color filters 10 should overlap in order to avoid decoloring to increase a panel display quality. However, with the width accuracy and the position accuracy with respect to the BM 9 of the spacer 8, the width accuracy of the BM 9, and the width accuracy and the position accuracy with respect to BM 9 of the color filters 10, the BM 9 should have a width of approximately 10 to 15 μm each side, causing low aperture ratio and low brightness. There is thus the problem that a less costly backlight with lower power consumption is unachievable in a liquid crystal display device.

In the arrangement shown in FIG. 11, the spacer contacts the TFT substrate on the gate line 1. The line width e of the BM 9 in this arrangement is the sum of a plus b in FIG. 11 which is approximately 30 μm.

However, in order to provide the spacer 8 avoiding an uneven gap, the width of the BM should be wider (approximately 35 to 45 μm) in this case as well. Accordingly, an aperture ratio is decreased to reduce brightness. The conventional liquid crystal display device thereby has the problem that a less costly backlight with lower power consumption is unachievable.

Further, in the conventional TFT substrate shown in FIGS. 10 and 11, even when the widths of the gate line 1, source line 2, and BM 9 are narrowed down for a higher aperture ratio, it is impossible to narrow the width of the BM around the spacer 8, thus hindering increase in the aperture ratio.

SUMMARY OF THE INVENTION

The present invention has been accomplished to solve the above problems and an object of the present invention is thus to provide a liquid crystal display device with a high aperture ratio and high brightness.

A liquid crystal display device according to the present invention is a liquid crystal display device having the first and second substrates, a spacer (the spacer 8 in embodiments of the present invention, for example) to give a substantially equal gap between the substrates, and a liquid crystal layer interposed between the substrates. The first substrate includes a gate line (the gate line 1 in the embodiments of the present invention, for example), a source line (the source line 2 in the embodiments of the present invention, for example) crossing the gate line with an insulation film interposed therebetween, a switching element connected to the source line; a liquid crystal drive electrode (the liquid crystal drive electrode 5 in the embodiments of the present invention, for example) connected to the switching element and having a plurality of electrodes substantially parallel to each other, and a comb-shaped common electrode (the common electrode 6 in the embodiments of the present invention, for example) having a plurality of electrodes substantially parallel to and alternately with the liquid crystal drive electrode. The second substrate includes color filters (the color filters 10 in the embodiments of the present invention, for example) arranged in an array arrangement, and a light shielding layer (the BM 9 in the embodiments of the present invention, for example) provided between the color filters. The spacer contacts the first substrate in the area where the gate line, the liquid crystal drive electrode, and the common electrode are arranged in the vicinity of each other. The above configuration increases an aperture ratio to attain higher brightness.

A liquid crystal display device according to the present invention is a liquid crystal display device having the first and second substrates, a spacer to give a substantially equal gap between the substrates, and a liquid crystal layer interposed between the substrates. The first substrate includes a gate line, a source line crossing the gate line with an insulation film interposed therebetween, a switching element connected to the source line, a liquid crystal drive electrode connected to the switching element and having a plurality of electrodes substantially parallel to each other, and a comb-shaped common electrode having a plurality of electrodes arranged substantially parallel to and alternately with the liquid crystal drive electrode. The second substrate includes color filters arranged in an array arrangement and a light shielding layer provided between the color filters. The spacer contacts the first substrate in the area where the source line, the liquid crystal drive electrode, and the common electrode are arranged in the vicinity of each other. The above configuration increases an aperture ratio to attain higher brightness.

A liquid crystal display device according to the present invention is a liquid crystal display device having the first and second substrates, a spacer to give a substantially equal gap between the substrates, and a liquid crystal layer interposed between the substrates. The first substrate includes a gate line and a source line crossing the gate line with an insulation film interposed therebetween. The second substrate includes color filters arranged in an array arrangement and a light shielding layer provided between the color filters. The spacer contacts the first substrate in the area near a crossing point of the gate line and the source line. The above configuration increases an aperture ratio to attain higher brightness.

A liquid crystal display device according to the present invention is a liquid crystal display device having the first and second substrates, a spacer to give a substantially equal gap between the substrates, and a liquid crystal layer interposed between the substrates. The first substrate includes a gate line, a source line crossing the gate line with an insulation film interposed therebetween, a switching element connected to the source line, a liquid crystal drive electrode connected to the switching element, a common electrode arranged opposite to the liquid crystal drive electrode, and a common capacitor line arranged substantially parallel to the gate line and connected to the common electrode. The second substrate includes color filters arranged in an array arrangement and a light shielding layer provided between the color filters. The spacer contacts the first substrate in the area near a crossing point of the source line and the common capacitor line. The above configuration increases an aperture ratio to attain higher brightness.

The spacer is preferably arranged above the light shielding layer. An aperture ratio is thereby increased to attain higher brightness.

A liquid crystal display device according to the present invention is a liquid crystal display device having the first and second substrates, a spacer to give a substantially equal gap between the substrates, and a liquid crystal layer interposed between the substrates. The first substrate includes a gate line, a source line crossing the gate line with an insulation film interposed therebetween, a switching element connected to the source line, a liquid crystal drive electrode connected to the switching element, a common electrode arranged opposite to the liquid crystal drive electrode, and a common capacitor line arranged substantially parallel to the gate line and connected to the common electrode. The second substrate includes color filters arranged in an array arrangement and a light shielding layer provided between the color filters. The spacer contacts the first substrate above the common capacitor line, and contacts the second substrate above the color filters. The above configuration increases an aperture ratio to attain higher brightness.

The spacer is preferably arranged above the color filters. An aperture ratio is thereby increased to attain higher brightness.

It is also possible that the spacer is arranged above the first substrate. An aperture ratio is thereby increased to attain higher brightness.

The spacer can have a column shape. An aperture ratio is thereby increased to attain higher brightness.

It is preferable to apply the present invention to an In-Plane Switching mode liquid crystal display device.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
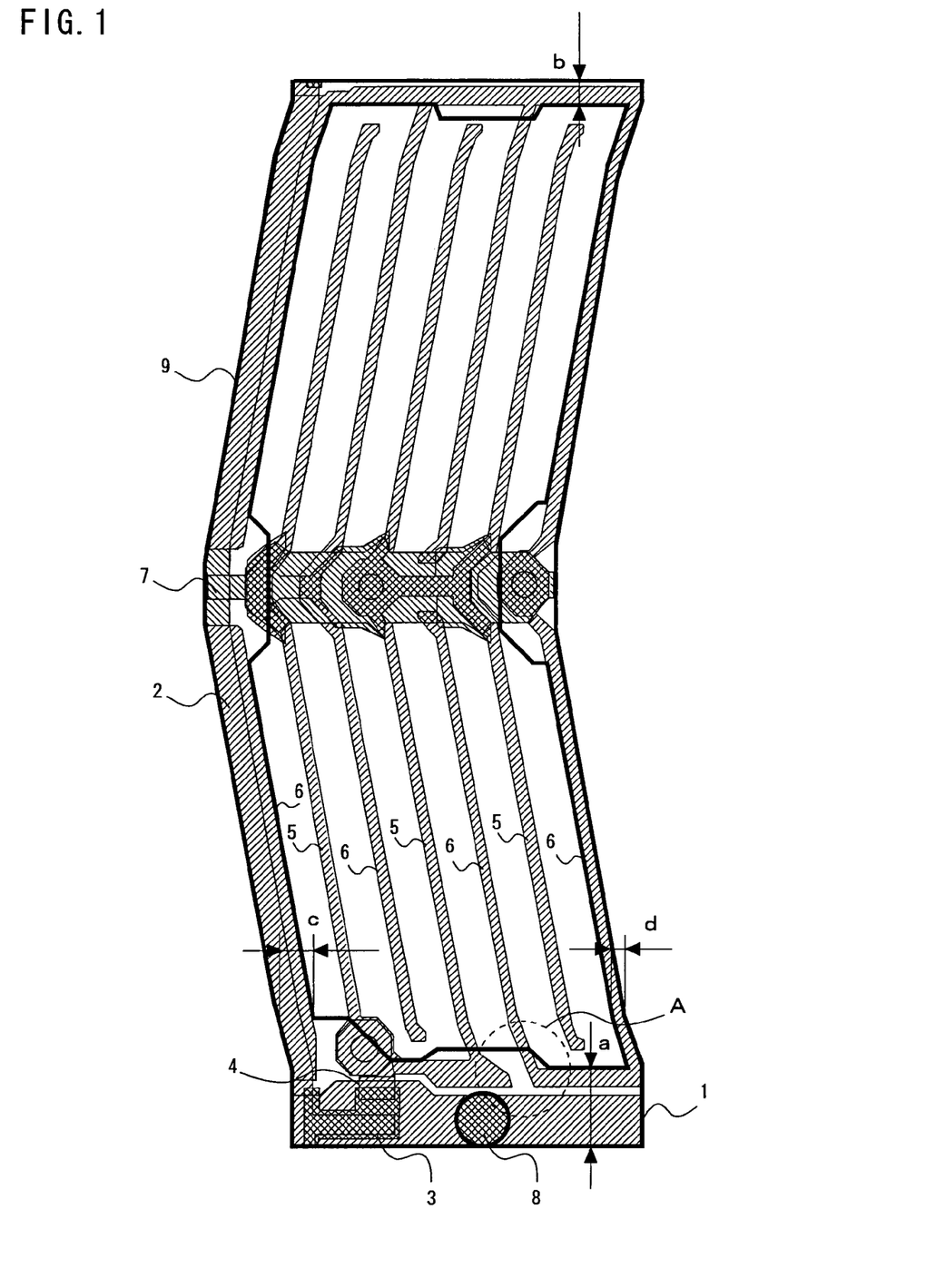
FIG. 1 is a block diagram of a pixel area of a liquid crystal display device according to the first embodiment of the present invention.

A liquid crystal display device according to the present invention has a TFT substrate and a SF substrate facing each other, between which is interposed liquid crystal material, just like the conventional liquid crystal display device. The structure of a pixel area of the liquid crystal display device is shown in FIG. 1. FIG. 1 illustrates the structure of the TFT substrate in one pixel. The reference numeral 1 designates a gate line, 2 a source line, 3 a source electrode, 4 a drain electrode, 5 a liquid crystal drive electrode, 6 a common electrode, 7 a common capacitor line, 8 a spacer, and 9 a BM.

A manufacturing process of the TFT substrate will be explained hereinbelow. First, a conductive film such as Al, Cr, Mo, Ti, and W is deposited on an insulating substrate using a sputtering device. Then, the gate line 1 and the common capacitor line 7 are formed by a photolithography process, etching process, and resist stripping process.

Next, a insulation film such as SiNx and a semiconductor film of a-Si film are deposited by a plasma CVD device on the insulating substrate on which the gate line 1 and the common capacitor line 7 have been formed. The semiconductor layer is doped with impurities such as P and As to form a $N^+$a-Si layer as an ohmic layer. Then, a semiconductor layer is formed by the photolithography process, etching process, and resist stripping process.

Further, a conductive film such as Al, Cr, Mo, Ti, and W is deposited thereon by the sputtering device. Then, a drain electrode 4, source electrode 3, and a source line 2 are formed by the photolithography process, etching process, and resist stripping process.

After that, SiNx film as an interlayer insulation film is deposited, and a contact hole is formed by the photolithography process, resist stripping process, and etching process. Then, a transparent conductive film such as an ITO film is deposited. By the photolithography process, etching process, and resist stripping process, the liquid crystal drive electrode 5 and the common electrode 6 are formed to be comb-shaped facing each other. The drain electrode 4 contacts the liquid crystal drive electrode 5, while the common electrode 6 contacts the common capacitor line 7, through the contact hole. A TFT is formed in the above process, and the TFT substrate having the TFTs in an array arrangement is used for a liquid crystal display device.

In the TFT substrate of an IPS mode, the liquid crystal drive electrode 5 and the common electrode 6 can be formed by a metal film such as Cr, Al, Mo, Ti, W, or can have a multilayer structure of metal Cr and oxidation Cr. It is also possible to form the liquid crystal drive electrode 5 and the common electrode 6 in the same process as the drain electrode 4.

Then, the TFT substrate is cleared, and an alignment layer is deposited thereon. Baking and rubbing treatments are processed after that. The rubbing direction is substantially parallel to the source line 2. Therefore, when the TFT is off, liquid crystal molecules are aligned substantially parallel to the source line 2.

Figure 8:
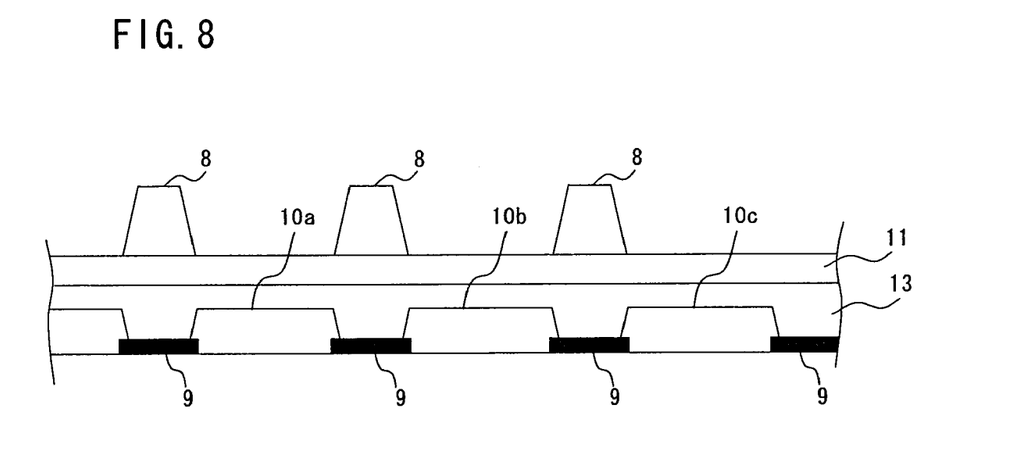
FIG. 8 is a block diagram of a CF substrate in a liquid crystal display device according to the present invention.

Now, a manufacturing process of the CF substrate will be explained hereinafter with reference to FIG. 8. First, a Cr film is deposited on an insulating substrate by the sputtering device. Then, the BM 9 which is a light shielding layer is formed by the photolithography process and so on. Though the Cr film is deposited by the sputtering in this case, it can be a bilayer of metal Cr and oxidation Cr, or another kind of film such as Ni and Al. Also, the film deposition method is not limited to the sputtering method, whereas another deposition method such as a vapor deposition method can be used. Further, a resin black matrix in which light shielding material is dispersed in a resin can be applied.

Then, red pigment is applied onto the substrate. The pigment is then patterned by resist coating, exposure, and development processes to form a red color filter 10*a* between the BM 9. A green color filter 10*b* and a blue color filter 10*c* are formed in the same manner, thereby forming color filters 10 of the three primary colors. The color filters 10 and the BM 9 overlap to prevent light from leaking. Though the present embodiment uses the pigment dispersion method, dyeing, electrical deposition, or printing methods can be also employed.

A overcoat layer 13 is then deposited, and the surface is smoothed. An alignment layer 11 is deposited thereon. After that, the baking and rubbing treatments are processed as is the case with the alignment layer of the TFT substrate. The rubbing direction is substantially parallel to the source line 2. Therefore, when the TFT is off, liquid crystal molecules are aligned substantially parallel to the source line 2. The overcoat layer 13 is heat and chemical resistant to protect the color filters 10. Though the overcoat layer 13 and the alignment layer 11 are formed separately, they can be formed in the same layer.

Then, the spacer 8 to make a gap between the TFT substrate and the CF substrate where liquid crystal material is filled is formed. The spacer 8 is formed by the photolithography process after a resin layer has been applied. The spacer 8 is tapered column shaped as shown in FIG. 8, its section being substantially circular. The diameter of the foot of the column (a contact surface at the side of the CF substrate) is approximately 15 μm. The larger is the section, the better uniformity of the gap is obtained over the entire substrate. However, since the overlap with the color filters 10 or the projection from the BM 9 causes the less uniformity of the gap between the substrates, the large BM width is required, decreasing the aperture ratio.

The TFT substrate and the CF substrate which have formed in the above process are laminated with sealing material, and liquid crystal material is filled therebetween. A liquid crystal panel is produced in the above process. The BM 9 is arranged in the area surrounded by the heavy line in FIG. 1.

Figure 2:
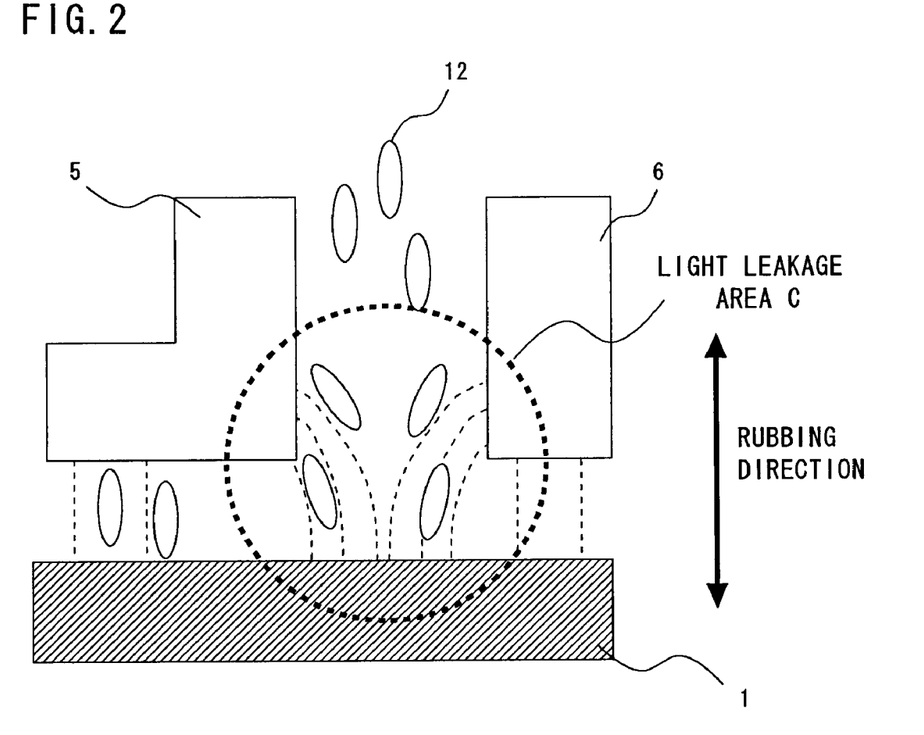
FIG. 2 is an enlarged view of the area A in FIG. 1.

In the following, the movement of liquid crystal molecules in the area on the TFT substrate where the gate line 1, liquid crystal drive electrode 5, and common electrode 6 are arranged in the vicinity of each other will be explained with reference to FIG. 2. FIG. 2 is an enlarged view of the area A shown by a broken line in FIG. 1. It is noted that, in FIGS. 1 and 2, the same elements are denoted by the same reference numerals, and redundant description will be omitted. The reference numeral 12 designates a liquid crystal molecule interposed between the TFT substrate and the CF substrate, and the broken line shows an electric field line when a voltage is applied only to the gate line 1.

As shown in FIG. 2, the rubbing treatment is given to the alignment layer 11. The rubbing direction is substantially perpendicular to the gate line 1. Since no voltage is applied to the liquid crystal drive electrode 5 when the TFT is off, the potential difference between the liquid crystal drive electrode 5 and the common electrode 6 approaches 0. Therefore, the liquid crystal molecules 12 are aligned in the same direction as the rubbing direction, blocking light from a backlight. It results in an IPS mode liquid crystal display device in a normally black mode.

When the liquid crystal is driven, on the other hand, a gate voltage changes to produce a potential difference near the gate line 1, and therefore the electric field line is in the same direction as the rubbing direction, as shown in the broken line. In the area outside of the light leakage area C near the gate line 1, the liquid crystal drive electrode 5 and the gate line 1 are substantially parallel, and so are the common electrode 6 and the gate line 1. The electric field line between them are therefore substantially perpendicular to the gate line 1. The liquid crystal molecules 12 are thus aligned in the same direction as the rubbing direction, blocking light from a backlight.

However, in the light leakage area C surrounded by the broken line in FIG. 2, the direction of the electric field line is different from the rubbing direction as shown in FIG. 2. Therefore, the liquid crystal molecules 12 are inclined to cause light to leak. To maintain contrast, the light leakage area C requires the BM 9 blocking light. Light leakage occurs in the area C when displaying black, causing an alignment error. A light blocking means is thus required in the alignment error area.

The spacer 8 is arranged in the above position according to the present embodiment of the invention. The line width e of the BM 9 on the gate line 1 outside of the area C is the sum of a plus b in FIG. 1 which is approximately 30 µm. Therefore, with the width accuracy and the position accuracy with respect to the BM 9 of the spacer 8, the width accuracy of the BM 9, and the width accuracy and the position accuracy with respect to BM 9 of the color filters 10 when forming the CF substrate, the spacer 8 sticks out the BM 9 and overlaps with the color filters 10, causing the less uniformity of the cell gap.

In the area where the gate line 1, the liquid crystal drive electrode 5, and the common electrode 6 are arranged in the vicinity of each other, the BM 9 is wider to block the light leakage area C. Therefore, placing the spacer 8 in this area prevents the spacer 8 from sticking out the BM 9 or overlapping with the color filters 10. It also narrows the widths of the lines and the BM in the area other than the alignment error area, reducing the BM area. A high aperture ratio is thereby attained to achieve higher brightness. In addition, power consumption and costs can be reduced for the backlight.

As explained in the foregoing, the first embodiment of the present invention provides the spacer in the area in which the gate line 1, liquid crystal drive electrode 5, and common electrode 6 are arranged in the vicinity of each other, or the alignment error area, where the wider BM width is required to avoid light leakage, thereby achieving a higher aperture ratio.

Second Embodiment

A liquid crystal display device according to the present invention will be explained hereinbelow with reference to FIGS. 3 and 4. It is noted that in FIGS. 1 to 4 the same elements will be denoted by the same reference numerals and redundant description will be omitted.

Figure 3:
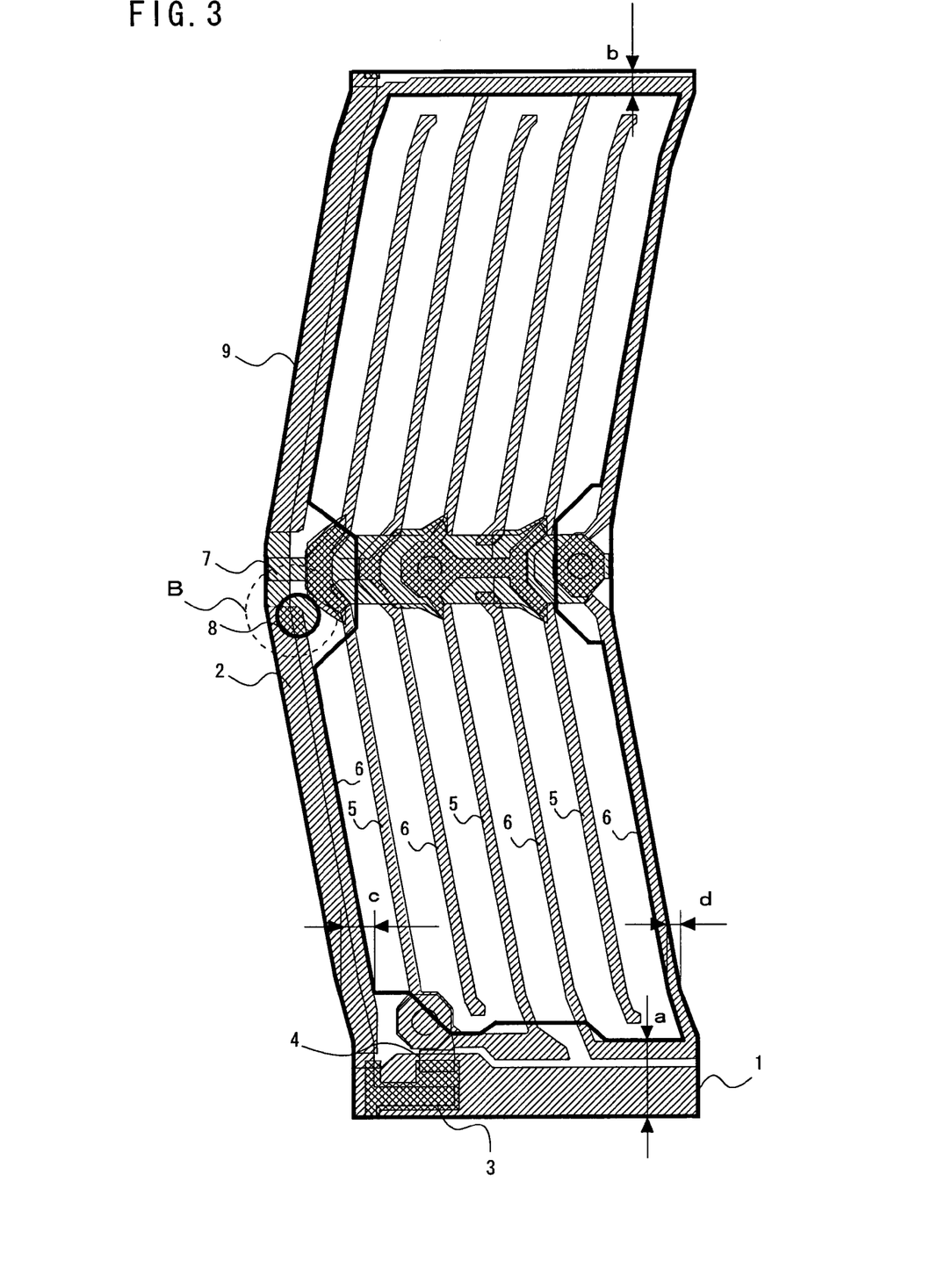
FIG. 3 is a block diagram of a pixel area of a liquid crystal display device according to the second embodiment of the present invention.

FIG. 3 illustrates the structure of a pixel area of a liquid crystal display device according to the second embodiment of the present invention. FIG. 4 is an enlarged view of the area B shown by a broken line in FIG. 3. A manufacturing method of a TFT substrate and a CF substrate in the second embodiment is the same as that in the first embodiment. The rubbing direction is also the same in the first and second embodiments.

In the second embodiment, the position of the spacer 8 is different from that in the first embodiment, as shown in FIG. 3. The spacer 8 is placed in the area where the source line 2, the liquid crystal drive electrode 5, and the common electrode 6 are arranged in the vicinity of each other.

The movement of liquid crystal molecules in the above area will be explained hereinafter with reference to FIG. 4. As described above, the rubbing treatment is given to the alignment layer 11 in the direction substantially perpendicular to the gate line 1 which is substantially parallel to the source line 2. When liquid crystal is driven, a source voltage changes. Accordingly, when a voltage is applied only to the source line 2, an electric field line near the source line 2 is as shown in FIG. 4. Therefore, the liquid crystal molecules 12 are inclined just like the first embodiment, to cause light leakage. The electric field line is substantially perpendicular to the rubbing direction between the liquid crystal drive electrode 5 and the source line 2. The liquid crystal molecules 12 are thus aligned perpendicular to the rubbing direction as shown in FIG. 4, which causes light to leak. Light leakage occurs in the area when displaying black to result in an alignment error. A light blocking means is thus required in the alignment error area.

Figure 4:
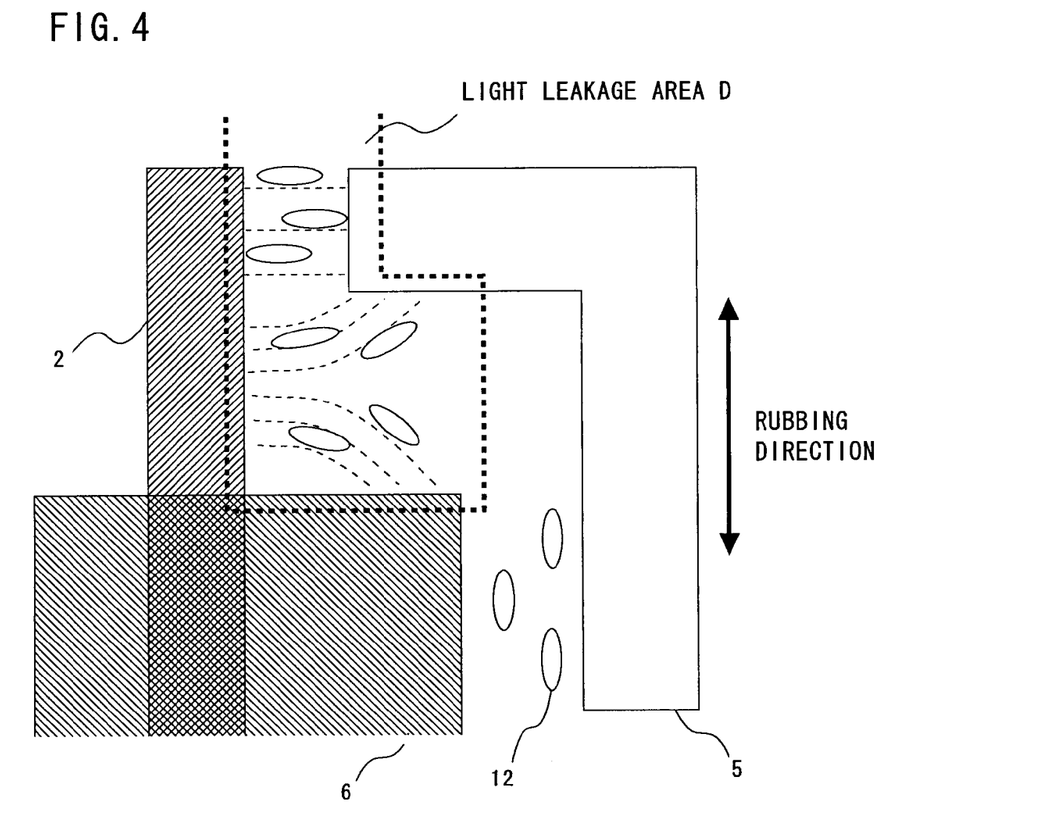
FIG. 4 is an enlarged view of the portion B in FIG. 2.

For the above reasons, light leakage occurs in the light leakage area D shown by the broken line in FIG. 4. Therefore, the area needs the BM 9 blocking light to maintain contrast, and the wider width of the BM is required in the light leakage area D. Therefore, placing the spacer 8 in this area prevents the spacer 8 from sticking out the BM 9 or overlapping with the color filters 10. It also narrows the widths of the lines and the BM in the area other than the alignment error area, reducing the BM area. A high aperture ratio is thereby attained to achieve higher brightness. In addition, power consumption and costs can be reduced for the backlight. The BM area should be larger near the area B.

As explained in the foregoing, the second embodiment of the present invention provides the spacer 8 in the alignment error area of the pixel area in which the source line 2, liquid crystal drive electrode 5, and common electrode 6 are arranged in the vicinity of each other, thereby achieving a higher aperture ratio.

Third Embodiment

Figure 5:
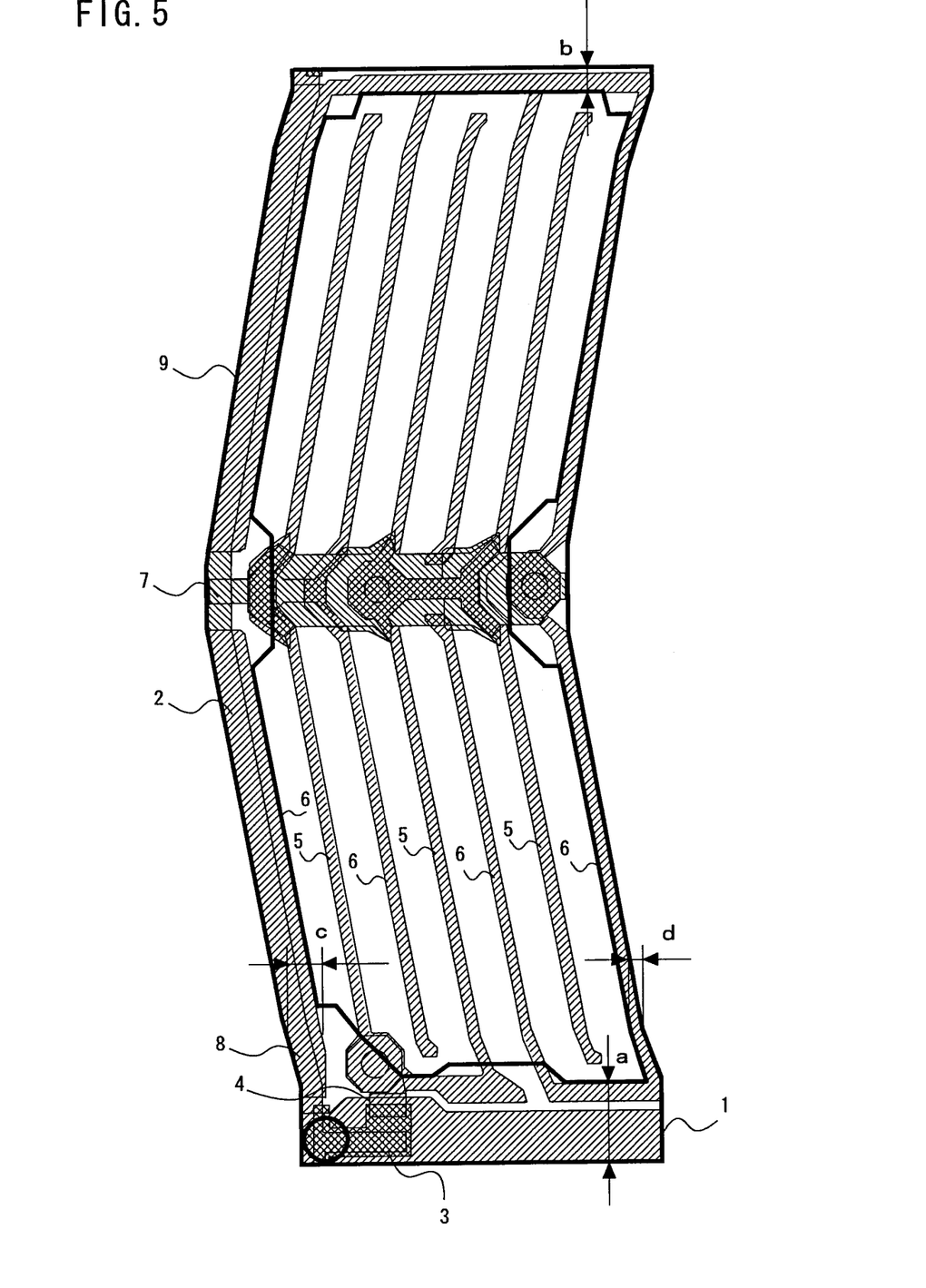
FIG. 5 is a block diagram of a pixel area of a liquid crystal display device according to the third embodiment of the present invention.
Figure 6:
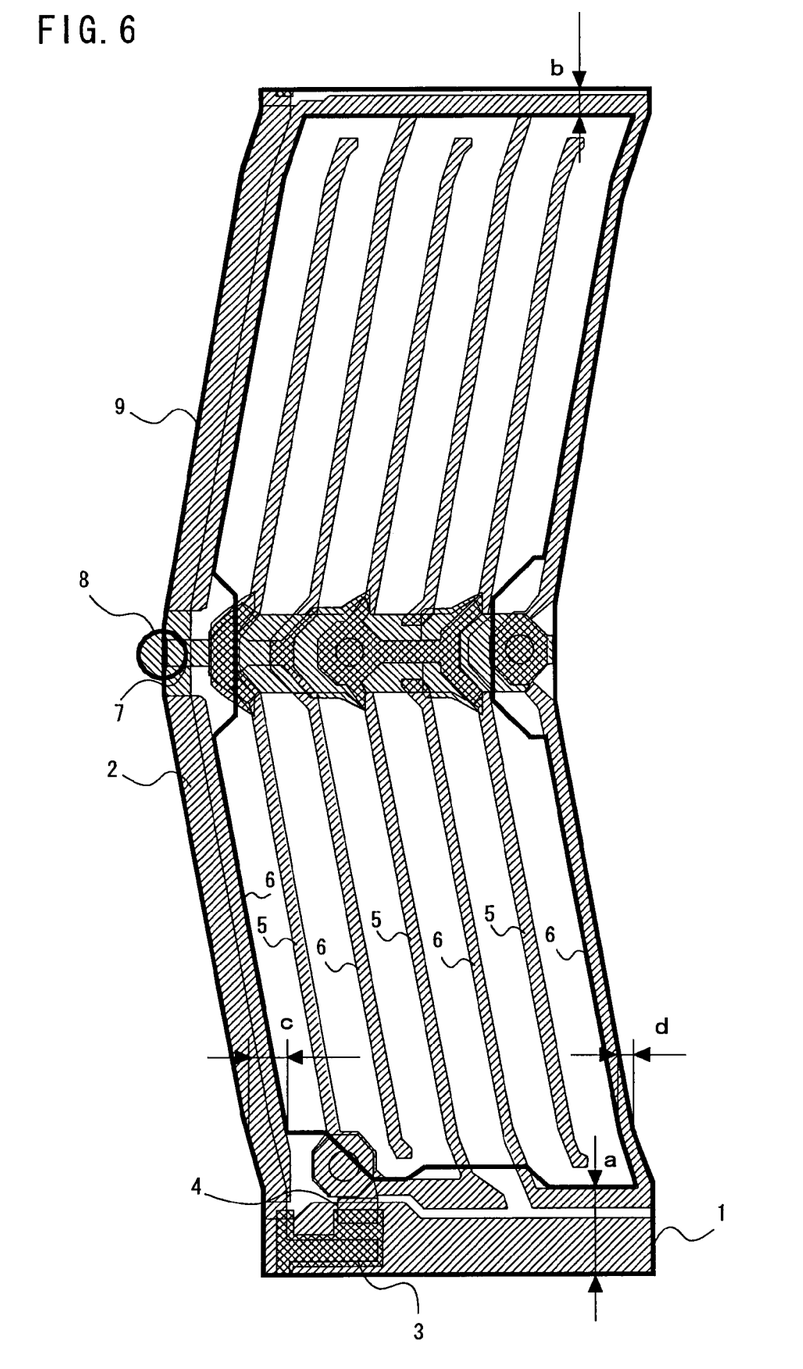
FIG. 6 is a block diagram of a pixel area of a liquid crystal display device according to the fourth embodiment of the present invention.

The same effect as above can be obtained when placing the spacer 8 in the alignment error area requiring the larger width of the BM 9 not described in the first and second embodiments. For example, the spacer can be placed near the crossing point of the gate line 1 and the source line 2. The gate line 1, source line 2, common electrode 6, and liquid crystal drive electrode 5 are arranged in the vicinity of each other in the area. An electric field produced by the potential difference between them causes misalignment of liquid crystal molecules, resulting in light leakage. Therefore, the area becomes an alignment error area where a light blocking means is required, and the BM 9 should have a larger width there. Placing the spacer 8 in this area allows reduction of the BM area, achieving a high aperture ratio. The BM area should be larger near the TFT in this case as shown in FIG. 5.

The liquid crystal panel having the above configuration is not limited to be applied to a liquid crystal display device of an IPS mode, but applicable to a liquid crystal display device of a TN mode and so on. It is possible to narrow the BM width and achieve a higher aperture ratio.

Fourth Embodiment

It is also possible to place the spacer 8 near the crossing point of the source line 2 and the common capacitor line 6. Since the source line 2 and the common capacitor line 6 cross each other in the area, an electric field line produced by the potential difference between the lines causes misalignment of liquid crystal molecules, resulting in light leakage. Therefore, the BM width outside of the area can be narrowed. The BM area is thus reduced, achieving a higher aperture ratio.

The liquid crystal panel having the above configuration is not limited to be applied to a liquid crystal display device of an IPS mode, but applicable to a liquid crystal display device of a TN mode and so on. Reduction of the BM area is thereby possible to achieve a higher aperture ratio.

The above first to fourth embodiments places the spacer 8 in an alignment error area where light leakage occurs and the larger width of the BM is required. The width of the BM in the area other than the alignment error area can be narrowed to reduce the BM area. A liquid crystal display device thereby has higher brightness, attaining a less costly backlight with lower power consumption.

Another Embodiment

Figure 7:
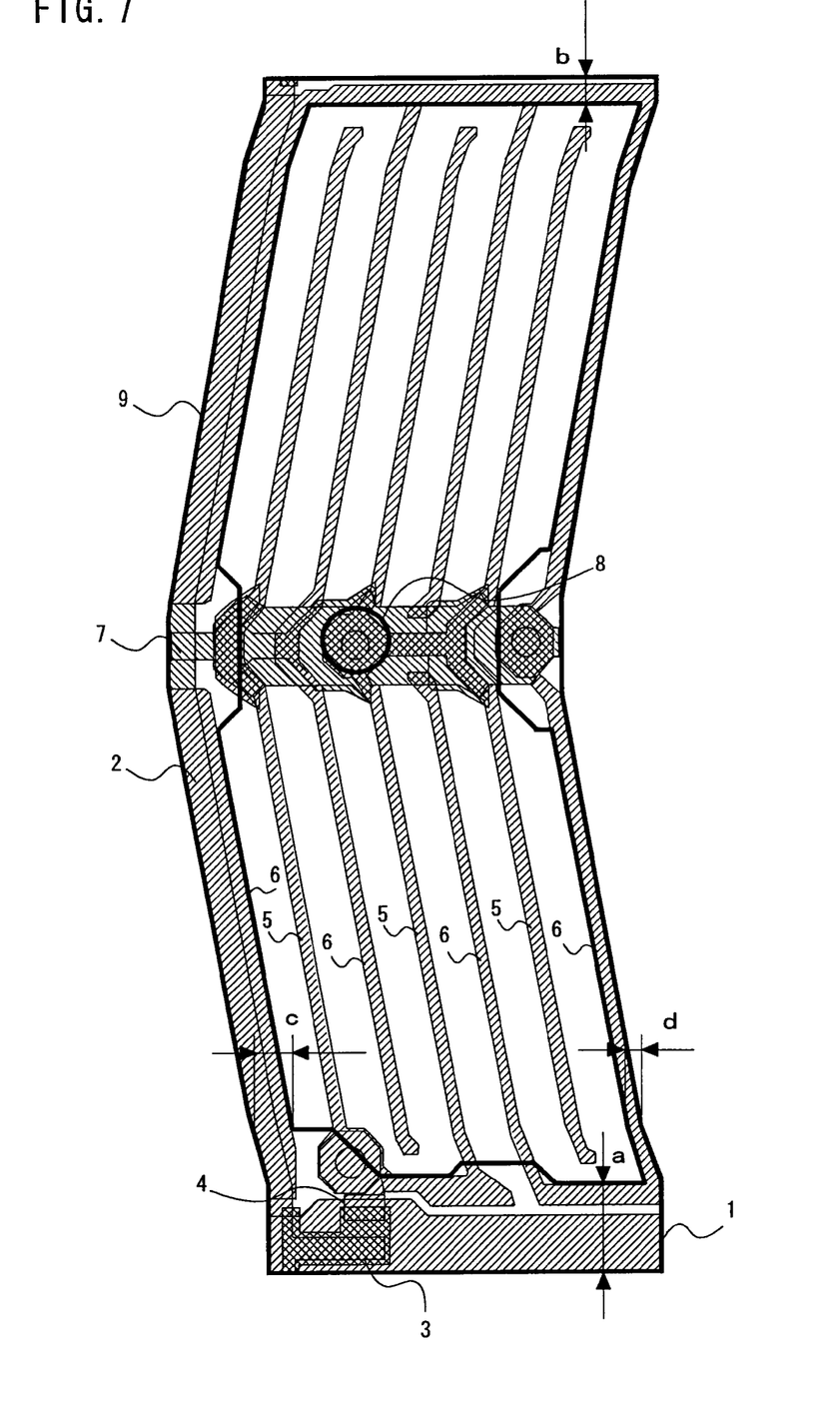
FIG. 7 is a block diagram of a pixel area of a liquid crystal display device according to another embodiment of the present invention.

It is further possible to place the spacer 8 on the common capacitor line 7 as shown in FIG. 7. The spacer 8 is not on the BM 9 but on the color filters 10 on the CF substrate. Since the common capacitor line 7 is formed by a metal film as described in the first embodiment, light from the backlight is blocked. The BM 9 is thus not required, and the spacer 8 can be placed without decreasing a display quality. Therefore, it is possible to arrange the spacer 8 on the BM 9 and reduce the BM area. The liquid crystal drive electrode 5 and the common electrode 6 are preferably formed by a nontransparent conductive film such as a metal film. The present embodiment allows the smaller area of the BM 9 over and near the gate line 1.

The liquid crystal panel having the above configuration is not limited to be applied to a liquid crystal display device of an IPS mode, but applicable to a liquid crystal display device of a TN mode and so on. A higher aperture ratio is thereby attained to increase brightness of a liquid crystal display device.

The spacer 8 is not limited to have a column shape, but can have a shape such as a dome, ball, and cylinder. Further, when placing the spacer 8 in the alignment error area, the diameter of the spacer 8 can be 15 μm and above in accordance with the size of the alignment error area. It ensures better uniformity of the gap between the substrates to reduce uneven brightness and color of a display. The section of the spacer 8 is not necessarily circular, and a polygonal shape such as triangle and quadrangle is also possible. The spacer 8 can be formed on the TFT substrate.

The layers and fabrication method for forming a TFT array substrate according to the present invention is not limited to those described in the first embodiment, but other kinds of layers or fabrication methods produce the same effect as long as the position of the spacer is the same. For example, the conductive film is not necessarily formed by Al, Cr, Mo, Ti, or W, but a metal such as Ni, Ag, Ta, and Cu or an alloy comprising mainly of those can be used. The insulation film is not limited to SiNx, but $SiO_2$ is also possible. The semiconductor layer 1 is not restricted to a-Si film (amorphous silicon), but p-Si film (poly-silicon) is also possible. Also, a $n^+$a-Si film has been formed as the ohmic layer by doping P and As, it is feasible to form a $p^+$a-Si film by doping B. In addition, the film deposition method is not restricted to the sputtering method or the plasma CVD method, whereas a vapor deposition method, low pressure CVD method, and normal pressure CVD method can be also used. The above variation in the layers and methods produce the same effects.

As explained in the foregoing, the present invention narrows the width of the black matrix to provide a liquid crystal display device with a high aperture ratio.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A liquid crystal display device having a first substrate, a second substrate, a spacer to give a substantially equal gap between the first substrate and the second substrate, and a liquid crystal layer interposed between the first substrate and the second substrate, the first substrate comprising:
   a gate line;
   a source line crossing the gate line with an insulation film interposed therebetween;
   a switching element connected to the source line;
   a liquid crystal drive electrode connected to the switching element and having a plurality of electrodes substantially parallel to each other; and
   a common electrode having a plurality of electrodes arranged substantially parallel to and alternately with the liquid crystal drive electrode, and
   the second substrate comprising:
   color filters arranged in an array arrangement; and
   a light shielding layer provided between the color filters;
   wherein a width of the light shielding layer increases in an alignment error area proximate where the source line, the liquid crystal electrode, and the common electrode oppose each other, the alignment error area being a region where light leakage occurs when displaying black, and the spacer overlaps with the source line and the light shielding layer in an area where the width of the light shielding layer increases.

2. A liquid crystal display device having a first substrate, a second substrate, a spacer to give a substantially equal gap between the first substrate and the second substrate, and a liquid crystal layer interposed between the first substrate and the second substrate, the first substrate comprising:
   a gate line;
   a source line crossing the gate line with an insulation film interposed therebetween;
   a switching element connected to the source line;
   a liquid crystal drive electrode connected to the switching element;
   a common electrode arranged opposite to the liquid crystal drive electrode; and
   a common capacitor line arranged substantially parallel to the gate line and connected to the common electrode, and
   the second substrate comprising:
   color filters arranged in an array arrangement; and
   a light shielding layer provided between the color filters;
   wherein a width of the light shielding layer increases in an alignment error area proximate where the source line and the common capacitor line cross each other, the alignment error area being a region where light leakage occurs when displaying black, and
   the spacer overlaps with the light shielding layer and a crossing point of the source line and the common capacitor line in an area where the width of the light shielding layer increases.

* * * * *